US012774370B2

(12) United States Patent
Slocik et al.

(10) Patent No.: US 12,774,370 B2
(45) Date of Patent: Oct. 27, 2026

(54) STABILIZED PROTEIN IONIC LIQUID APPLICATIONS

(71) Applicant: Government of the United States, as represented by the Secretary of the Air Force, Wright-Patterson AFB, OH (US)

(72) Inventors: Joseph M Slocik, Dayton, OH (US); Rajesh R. Naik, Centerville, OH (US); Patrick B Dennis, Cincinnati, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 1378 days.

(21) Appl. No.: 17/491,579

(22) Filed: Oct. 1, 2021

(65) Prior Publication Data

US 2023/0103798 A1 Apr. 6, 2023

(51) Int. Cl.
*C08J 3/09* (2006.01)

(52) U.S. Cl.
CPC .................................... *C08J 3/091* (2013.01)

(58) Field of Classification Search
CPC .... C08J 2489/00; C08J 3/091; C08J 2300/22; C08J 2367/04; C08J 2383/04; C08J 3/201; C09D 189/00
See application file for complete search history.

(56) References Cited

U.S. PATENT DOCUMENTS

2010/0233146 A1 9/2010 McDaniel

FOREIGN PATENT DOCUMENTS

CN 112294695 A * 2/2021 .............. A61K 8/87

OTHER PUBLICATIONS

CN-112294695-A (Feb. 2, 2021) machine translation.*
Mukhopadhayay, A, et al. 2020 Biomacromolecules 21: 867-877. (Year: 2020).
Perriman, AW., et al. 2010 Nature Chemistry 2(8): 622-626. (Year: 2010).
Liu, L., et al. 2014 WIRES Nanomed Nanobiotechnol 5: 599-614. (Year: 2014).

* cited by examiner

*Primary Examiner* — Ana L. Woodward
(74) *Attorney, Agent, or Firm* — AFMCLO/JAZ; Eugene P. Sunday

(57) ABSTRACT

A method for modifying the properties of balsa wood comprises infiltrating a protein ionic liquid comprising polymerized dopamine into delignified balsa wood. A method of making an optically active protective coating comprises mixing protein ionic liquid comprising polymerized dopamine with ethyl acetate-based or water-based nail polish. A method of making a thermoplastic having biological activity comprises melting a thermoplastic; and blending a protein ionic liquid with the thermoplastic; and cooling the thermoplastic protein ionic liquid blend to a solid state. The thermoplastic is a hot glue stick. The protein ionic liquid comprises antibodies, enzymes, or fluorescent proteins. A method of making a chymotrypsin protein ionic liquid/thermoplastic material comprises mixing cationized chymotrypsin and anions of poly(ethylene glycol) 4-nonylphenyl 3-sulfopropyl ether to form a chymotrypsin and anion complex; lyophilizing and melting the cationized chymotrypsin and anion complex to form a water-free ionic liquid; blending the chymotrypsin ionic liquid with molten hot glue/thermoplastic.

1 Claim, 12 Drawing Sheets
(12 of 12 Drawing Sheet(s) Filed in Color)

STABILIZED PROTEIN IONIC LIQUID APPLICATIONS

RIGHTS OF THE GOVERNMENT

The invention described herein may be manufactured and used by or for the Government of the United States for all governmental purposes without the payment of any royalty.

FIELD OF THE INVENTION

The present invention relates generally to a variety of materials and, more particularly, to the creation of materials incorporating proteins using high temperature processing of protein ionic liquids, the introduction of biological activity to "inert" materials through addition of protein additives, and the uniform incorporation of functional proteins in the materials, e.g. wood, thermoplastics, enamel, adhesives, and elastomers.

BACKGROUND OF THE INVENTION

Industrial and commercial thermoplastics (e.g. ethylene vinyl acetate, polycaprolactone) represent economically important materials for the manufacturing of "single use" packaging, plastic cases to contain and protect electronics, biomedical and diagnostic devices, and in everyday household products. In these material applications the thermoplastics are durable and lightweight, chemically and biologically inert, and completely immiscible and incompatible with biological materials. Notably, the incompatibilities occur due to the differences in properties (solubility, hydrophobicity) and processing conditions required for proteins and plastics. For example, biological materials (i.e. proteins and antibodies) require aqueous environments and physiological conditions (neutral pH, ambient temperatures 25-37° C.) to be functionally active; thermoplastics demand high temperatures for melting and processing. Consequently, if these processing issues could be overcome, plastics may benefit from the addition of biomolecules. Benefits might include improvements in biodegradability and biocompatibility, reduction of plastic content/waste, and introduction of functionality/bio-activity to non-traditional plastics. However, to date, the biological modification of plastics is limited to surface-functionalization techniques that involve multiple inefficient steps and result in low surface densities of biomolecules. Currently, commercial uses include surface functionalization of plastic 96-well plates for diagnostic assays such as ELISA and antimicrobial plastic surfaces.

What is desired is a way to exploit the universal solubility, high temperature processibility, and compatibility of protein ionic liquids with non-biological and inert plastic-based materials to create thermoplastics and other materials embedded with functional proteins and achieve bioactive materials.

SUMMARY OF THE INVENTION

The present invention overcomes the foregoing problems and other shortcomings, drawbacks, and challenges of adding bioactivity to materials heretofore incompatible with such activity. While the invention will be described in connection with certain embodiments, it will be understood that the invention is not limited to these embodiments. To the contrary, this invention includes all alternatives, modifications, and equivalents as may be included within the spirit and scope of the present invention.

Protein ionic liquids are well suited for creating complex composites with incompatible and dissimilar materials by possessing enhanced solubility in neat polymer liquids, thermal resistance to extreme temperatures, and ability to match high viscosities of high molecular weight polymeric plastics when melted.

According to one embodiment of the present invention, a method for modifying the properties of balsa wood comprises infiltrating a protein ionic liquid comprising polymerized dopamine into delignified balsa wood.

According to another embodiment of the invention, a method of making an optically active protective coating comprises mixing a protein ionic liquid comprising polymerized dopamine with one of an ethyl acetate-based nail polish and a water-based nail polish.

According to a further embodiment of the invention, a method of making a thermoplastic having biological activity comprises melting a thermoplastic; and blending a protein ionic liquid with the thermoplastic; and cooling the thermoplastic protein ionic liquid blend to a solid state, wherein the thermoplastic is a hot glue stick, wherein the protein ionic liquid comprises at least one of antibodies, enzymes, fluorescent proteins.

According to a further embodiment of the invention, protein ionic liquids made from antibodies, enzymes, and/or fluorescent proteins, were blended with thermoplastics (e.g. commercially-available hot glue stick) to create functional bioplastics using high temperature processing. For processing, a piece of solid thermoplastic was melted in the presence of protein ionic liquid on a hot plate at 95° C. until flowing, blended together to reach homogeneity, and solidified into a new bioplastic material by cooling to room ~~~ temperature. The bioplastic containing a uniform dispersion of protein within the hot glue was remolded into various shapes, including the shape of a glue stick (to accommodate the feed mechanism and nozzle of a hot glue gun), a screw, and a miniature scale B2 bomber. Molded protein/plastic structures were cross-sectioned and tested to verify biological activity.

According to another embodiment of the invention, a method of making a chymotrypsin protein ionic liquid/thermoplastic material comprises mixing cationized chymotrypsin and anions of poly(ethylene glycol) 4-nonylphenyl 3-sulfopropyl ether to form a chymotrypsin and anion complex; lyophilizing and melting the cationized chymotrypsin and anion complex to form a water-free ionic liquid; blending the chymotrypsin ionic liquid with molten hot glue/thermoplastic; and cooling to create a proteolytic thermoplastic plastic/glue.

According to a further embodiment of the invention, the method of making a chymotrypsin protein ionic liquid/thermoplastic material further comprises blending the chymotrypsin ionic liquid with optically-active particles prior to blending the chymotrypsin ionic liquid with molten hot glue/thermoplastic, wherein the optically-active particles are one or more of quantum dots (QDs) and gold nanorods (NRs); and cooling to create an optically-active material.

According to another embodiment of the invention, a method of making a biologically-active rabbit IgG ionic liquid material comprises mixing cationized rabbit IgG antibodies and anions of poly(ethylene glycol) 4-nonylphenyl 3-sulfopropyl ether to form a rabbit IgG antibody and anion complex; lyophilizing and melting the cationized rabbit IgG antibody and anion complex to form a water-free ionic liquid; blending the rabbit IgG antibody ionic liquid with one of molten hot glue/thermoplastic, an uncured two-part epoxy, polycaprolactone (PCL), and uncured silicone elastomer; and cooling or curing to create a biorecognition material with high binding affinity. Binding affinities are determined from measuring dissociation binding constants (Kd) by SPR or QCM methods. High binding affinities are defined as having low dissociation constants (Kd). Antibodies are universally characterized by having high binding affinities (low Kd). Biorecognition is used to describe specificity of a biomolecule to bind an antigen.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention. The patent or application file contains at least one drawing executed in color. Copies of this patent or patent application publication with color drawing(s) will be provided by the Office upon request and payment of the necessary fee.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

This application incorporates by reference U.S. application Ser. No. 15/490,832, filed 23 Feb. 2017 (now U.S. Pat. No. 10,463,733); U.S. application Ser. No. 16/587,092, filed 30 Sep. 2019; U.S. application Ser. No. 16/587,124, filed 30 Sep. 2019; U.S. application Ser. No. 16/587,154, filed 30 Sep. 2019; U.S. application Ser. No. 16/587,199, filed 30 Sep. 2019; U.S. application Ser. No. 16/587,611, filed 30 Sep. 2019; U.S. application Ser. No. 16/256,029, filed 24 Jan. 2019; and U.S. application Ser. No. 16/592,809, filed 4 Oct. 2019.

The terms "about" and "approximately" correspond to the stated value +/−10% or +/−10° C. and any sub-range of values within the larger range.

Figure 1:
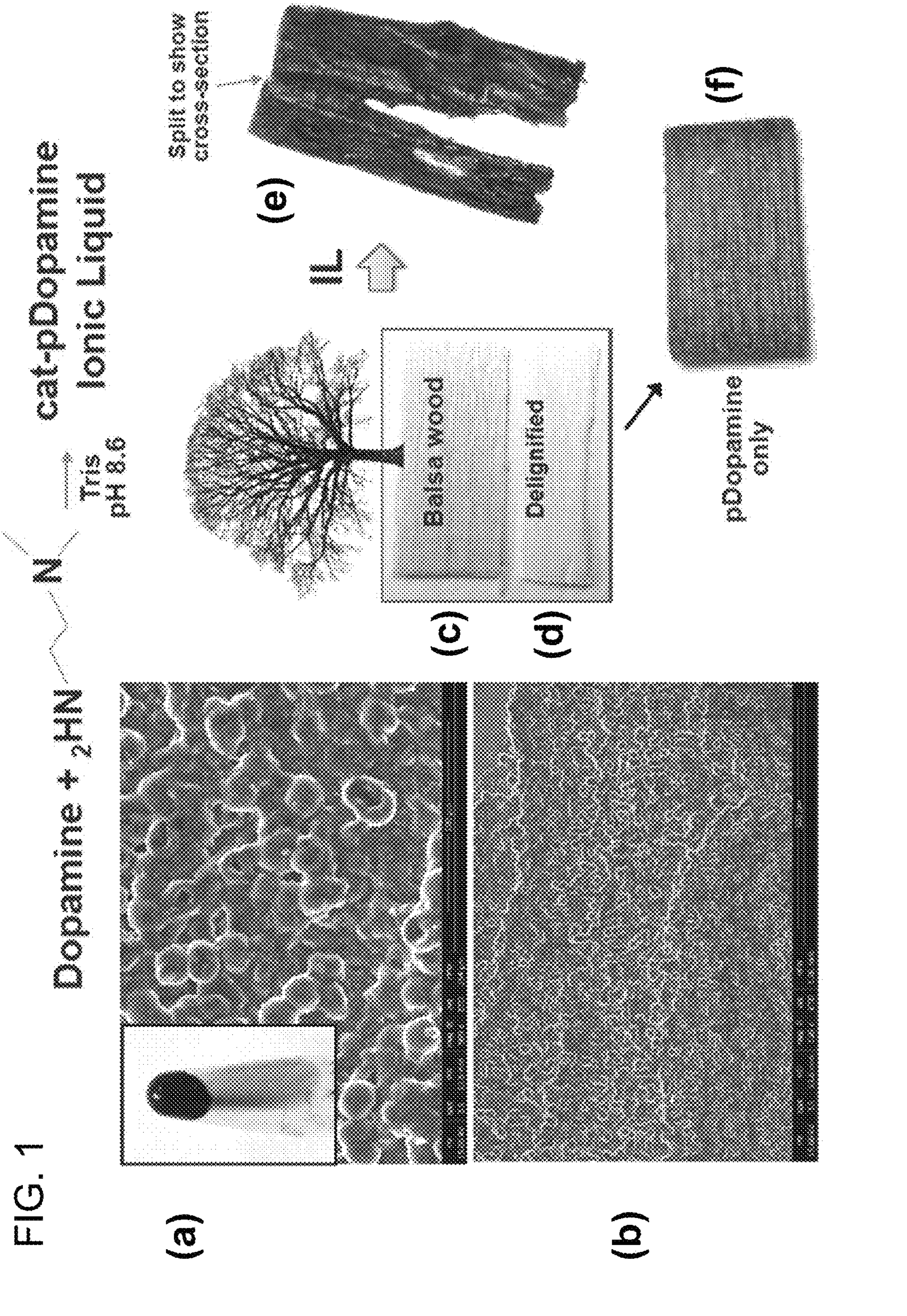
FIG. 1 presents the creation of melanin-like ionic liquids, i.e. pDopamine IL, and using the melanin-like ionic liquids to convert soft wood into hard wood.
Figure 2:
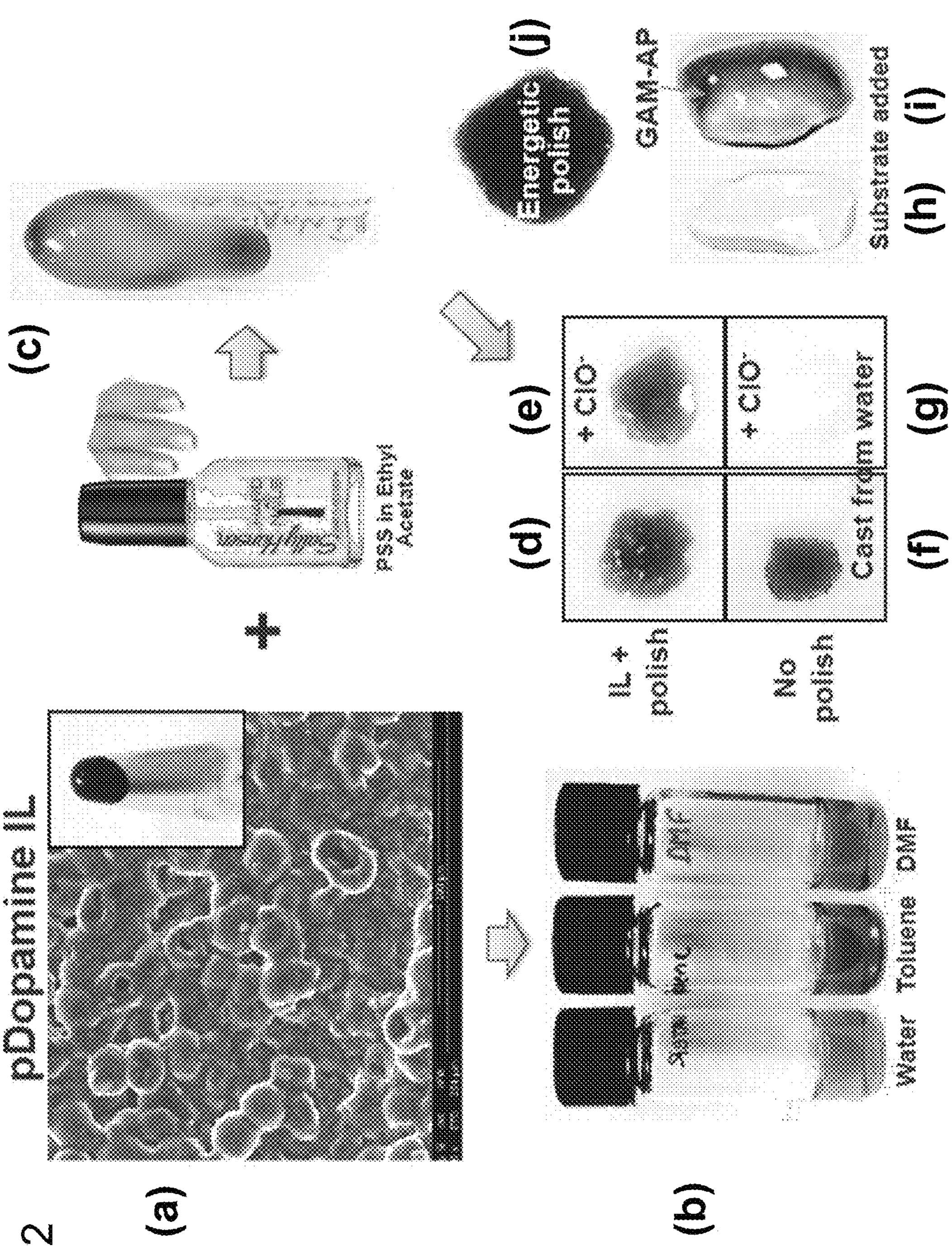
FIG. 2 presents the use melanin-like ionic liquids, i.e. pDopamine IL, in ethyl acetate compositions.

With regard to FIGS. 1-2, a protein ionic liquid comprised of polymerized dopamine was infiltrated into delignified balsa wood (FIG. 1) in order to create a "hard" wood material or separately mixed with an ethyl acetate based nail polish (FIG. 2) or a water-based "non-toxic" polish. The function of the ionic liquid is to increase miscibility with ethyl acetate based nail polishes. Without having been converted into an ionic liquid, the melanin-like material would not be miscible with nail polish containing ethyl acetate solvents and would produce visible clumps. P-dopamine is miscible with water-based polish and doesn't have to be made into an ionic liquid in such applications. Melanin-like ionic liquids were prepared by polymerizing dopamine in the presence of dimethylaminopropylamine and tris buffer for 18 hours, balancing charges with a stoichiometric amount of poly(ethylene glycol) 4-nonylphenyl 3-sulfopropyl ether anions, lyophilizing to dryness, and melting to form a melanin-like ionic liquid at about 50° C. The result is an optically active and protective coating. Properties of nail polish include imparting chemical resistance to polymerized dopamine, e.g. in nail polish, the polymerized dopamine is resistant to bleach.

Figure 3:
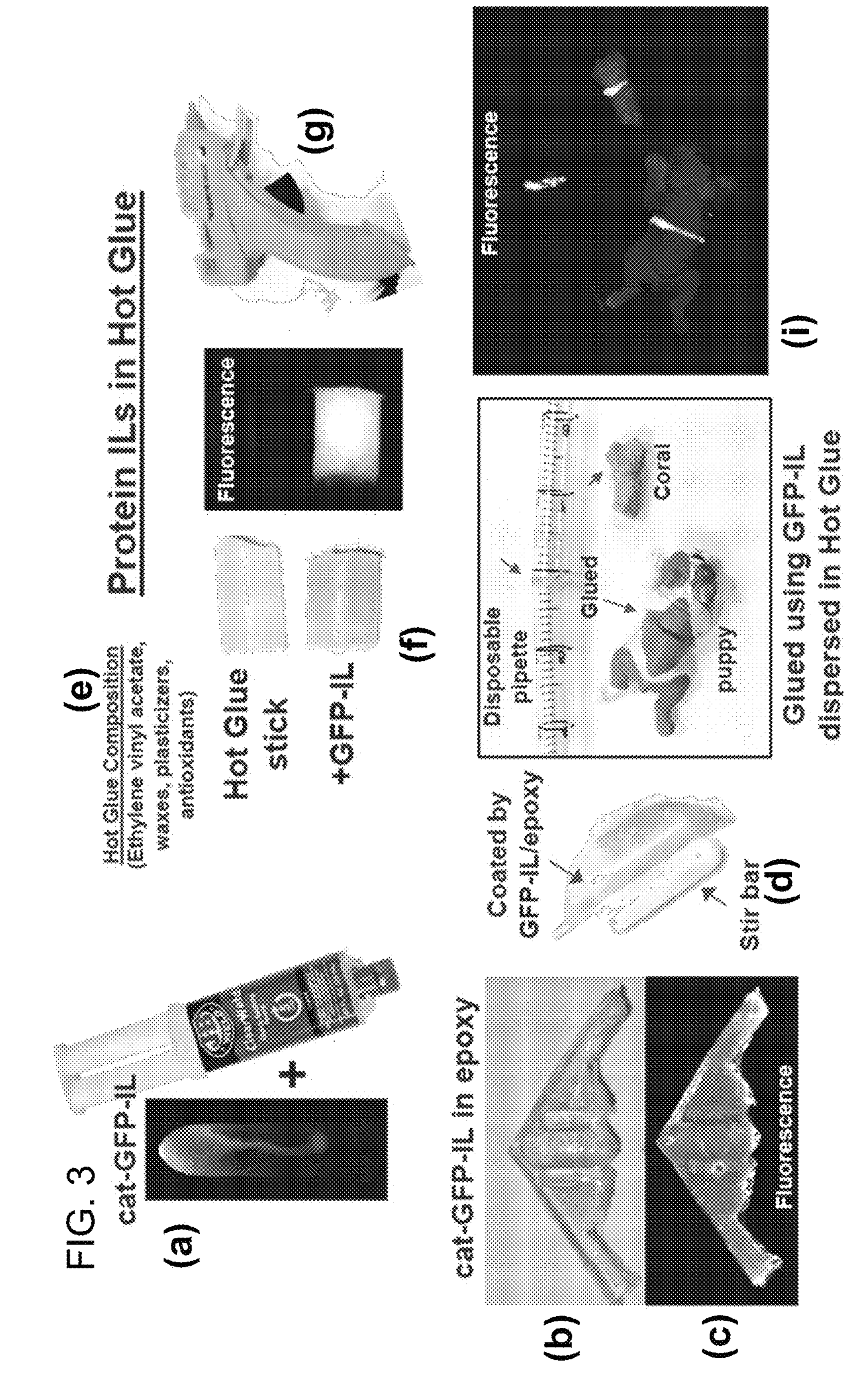
FIG. 3 presents green fluorescent protein (GFP) ionic liquid blended with adhesives while retaining the functionality of the GFP.
Figure 4:
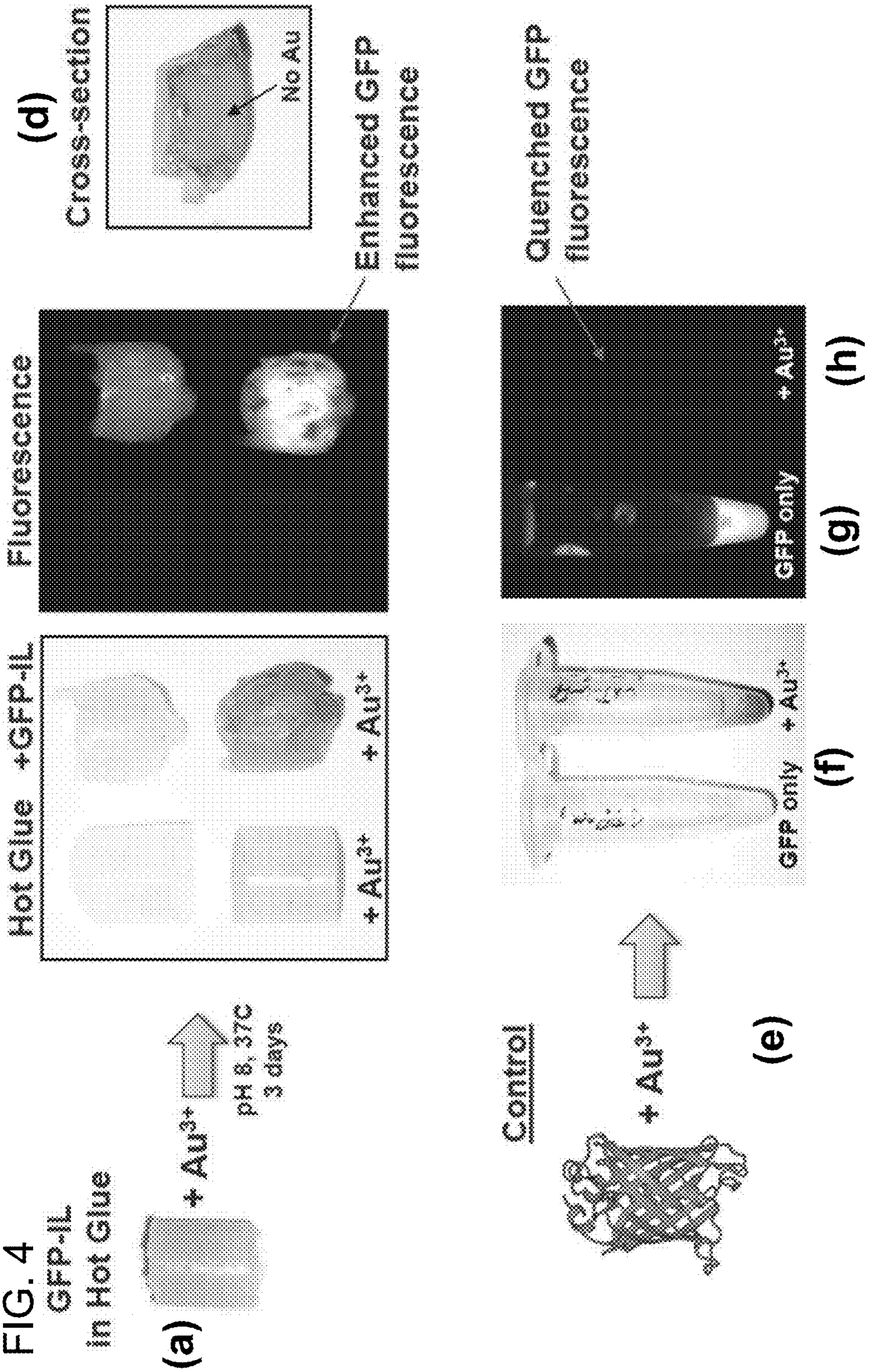
FIG. 4 depicts the biosynthesis of gold nanoparticles by GFP ionic liquid blended with hot glue.
Figure 5:
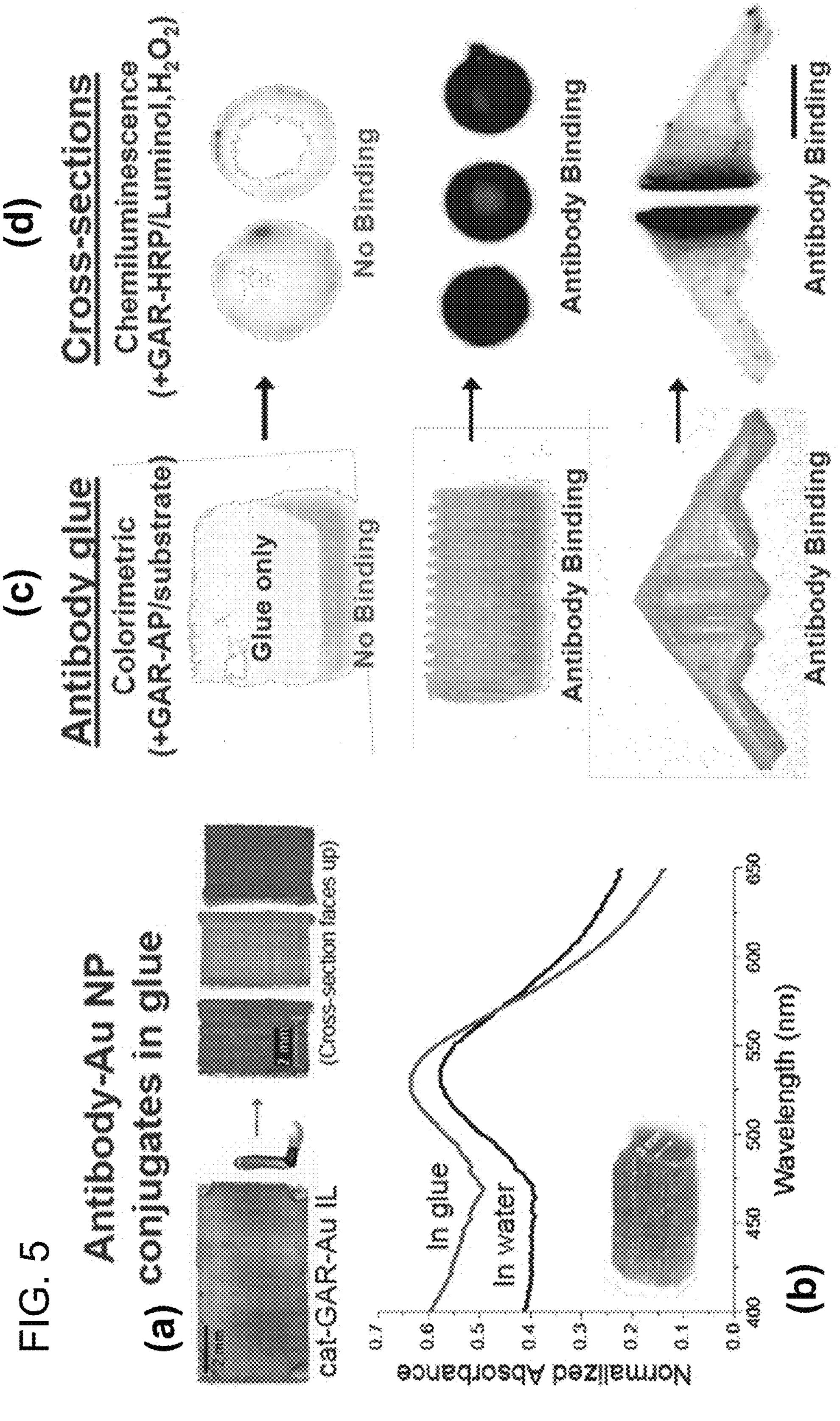
FIG. 5 depicts the creation and binding activity of hot glue blended with rabbit IgG antibody ionic liquids.

With regard to FIGS. 3-7, protein ionic liquids made from antibodies, enzymes, and/or fluorescent proteins (made by the process described in U.S. Pat. No. 10,463,774 issued 5 Nov. 2016 and U.S. Pat. No. 11,058,770 issued 13 Jul. 2021, both of which are incorporated by reference), were blended with thermoplastics (e.g. commercially-available hot glue stick) to create functional bioplastics using high temperature processing. For processing, a piece of solid thermoplastic was melted in the presence of protein ionic liquid on a hot plate at 95° C. until flowing, blended together to reach homogeneity, and solidified into a new bioplastic material by cooling to room temperature. The bioplastic containing a uniform dispersion of protein within the hot glue may be remolded into various shapes, e.g. the shape of a glue stick (to accommodate the feed mechanism and nozzle of a hot glue gun), a screw, and a miniature scale B2 bomber, as depicted in FIG. 5, or other shapes, as desired. Molded protein/plastic structures were cross-sectioned and tested to verify biological activity.

Figure 8:
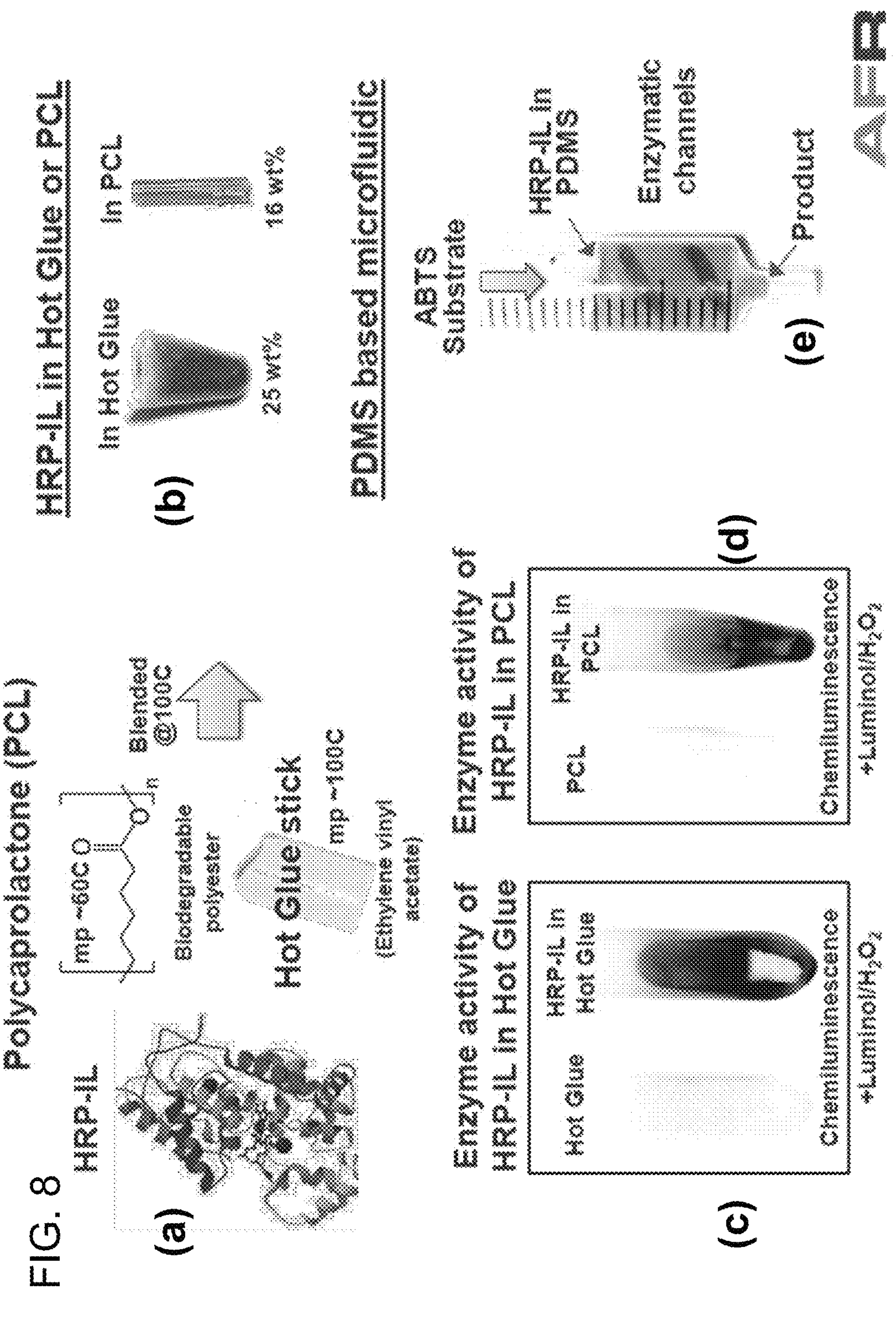
FIG. 8 depicts horseradish peroxidase ionic liquids (HRP_IL) combined and blended with hot glue or polycaprolactone to form a moldable blend that retains enzymatic activity.

With regard to FIG. 8, horse radish peroxidase (HRP) was converted into an ionic liquid (i.e. The cation is an HRP enzyme that has been cationized and the anion is Poly (ethylene glycol) 4-nonylphenyl 3-sulfopropyl ether. The cationized HRP and anion complex is lyophilized and melted to form water-free ionic liquid), blended with hot glue at 95° C., and cooled. Similarly, horse radish peroxidase was converted into an ionic liquid (i.e. We used a cationized HRP enzyme and anions of Poly(ethylene glycol) 4-nonylphenyl 3-sulfopropyl ether. The cationized HRP and anion complex is lyophilized and melted to form water-free ionic liquid), blended with polycaprolactone (PCL) at 95° C. and cooled. Horse radish peroxidase was converted into an ionic liquid, blended with PDMS at room temperature and cured. Each of these enzyme compositions are enzymatically-active. The enzymatic activity of these materials was confirmed by measuring chemiluminescence or the presence of a colorimetric product, as depicted.

Figure 9:
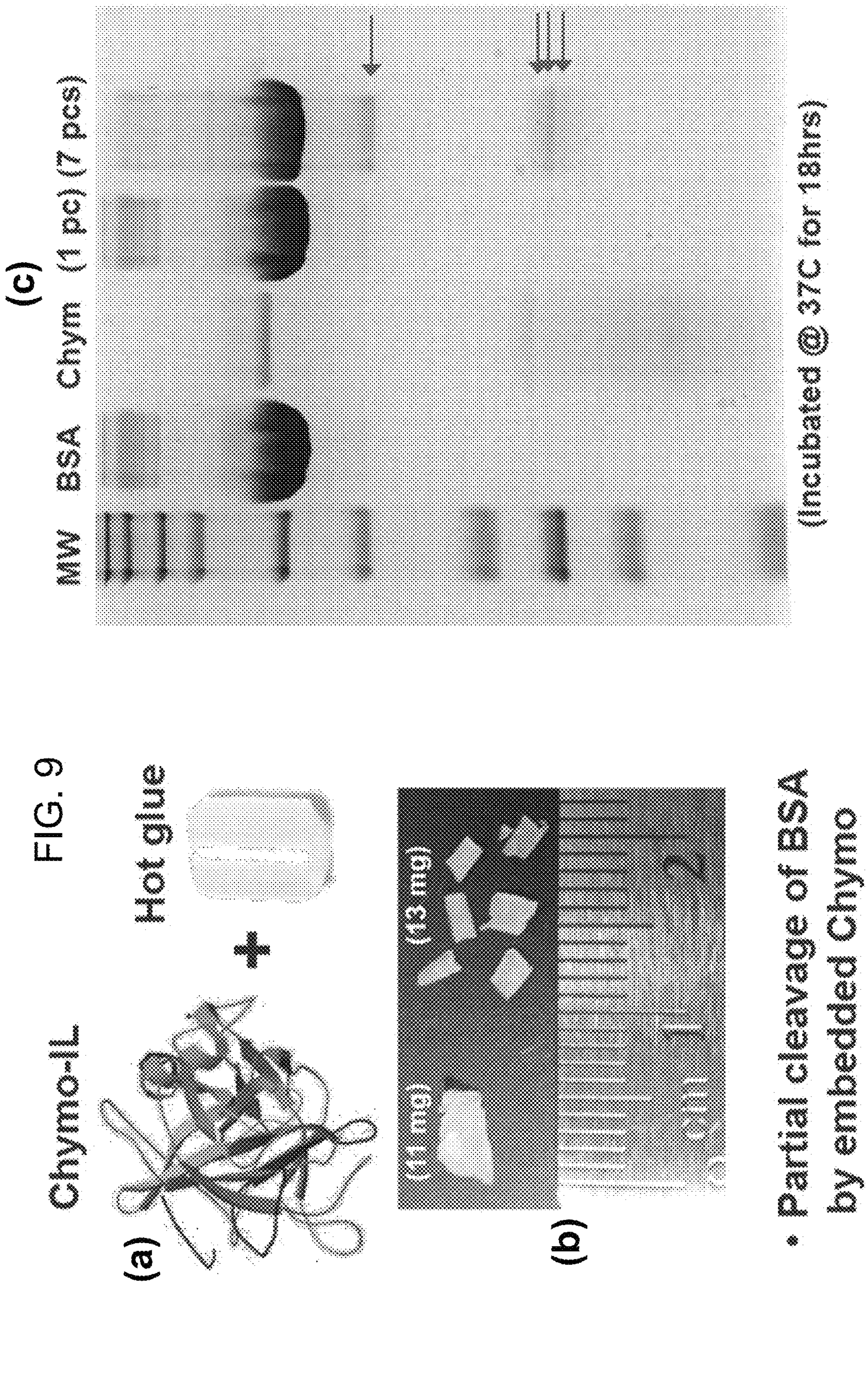
FIG. 9 depicts chymotrypsin converted into a protein ionic liquid and blended with hot glue to create a proteolytic glue that retains the enzymatic activity of chymotrypsin.

With regard to FIG. 9, chymotrypsin protein ionic liquid (i.e. We used cationized chymotrypsin and anions of Poly (ethylene glycol) 4-nonylphenyl 3-sulfopropyl ether. The cationized chymotrypsin and anion complex is lyophilized and melted to form water-free ionic liquid) was blended with hot glue at 95° C. (see image (a)) and cooled to create proteolytic plastic/glue (see image (b)) for cleavage of protein substrates (bovine serum albumin-BSA), as presented in image (c).

Figure 10:
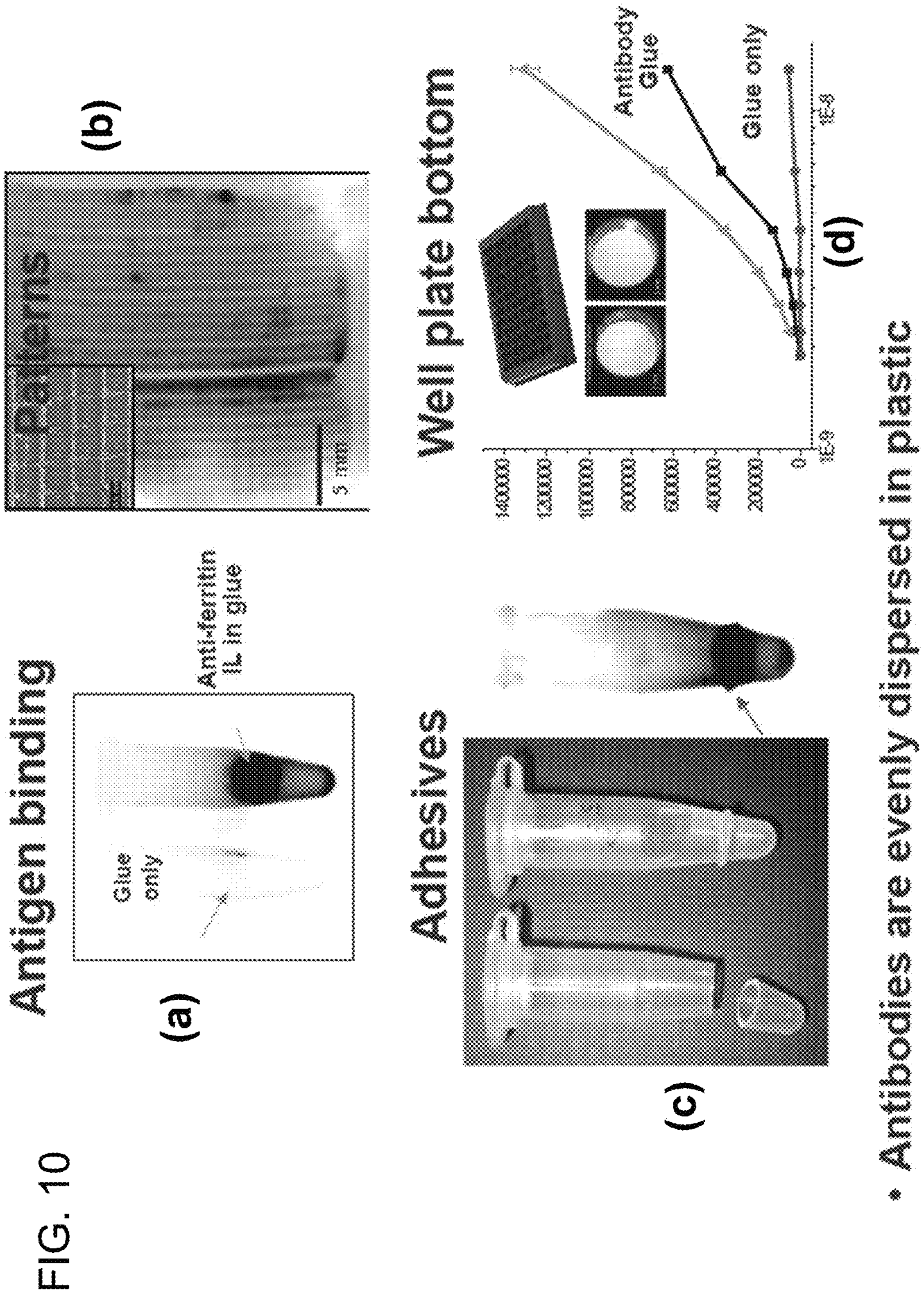
FIG. 10 depicts anti-ferritin antibody ionic liquids blended with hot glue while retaining the binding activity of the antibodies.

With regard to FIG. 10, rabbit IgG ionic liquids (i.e. We used a cationized rabbit IgG antibody obtained from rabbit serum and a cationized Anti-ferritin antibody from rabbit. Each cationized antibody was charge balanced with anions of is Poly(ethylene glycol) 4-nonylphenyl 3-sulfopropyl ether) from serum with broad specificity or specific against a ferritin antigen were blended with hot glue at 95° C. and patterned on a surface (image (b)), used as an adhesive to glue two pieces of a microfuge tube together (image (c)), or assembled with 96-well plates (image (d)) to create plastic glue well bottoms. Binding activity of the antibody plastics with a secondary antibody was confirmed by chemiluminescence (image (d)). The secondary antibody, such as a goat Anti-rabbit antibody, is an antibody produced in goats that is able to bind to any specific primary antibody that comes from rabbit. Here we used a goat Anti-rabbit antibody conjugated to horseradish peroxidase enzyme to detect rabbit IgG in plastic by chemiluminescence.

Figure 11:
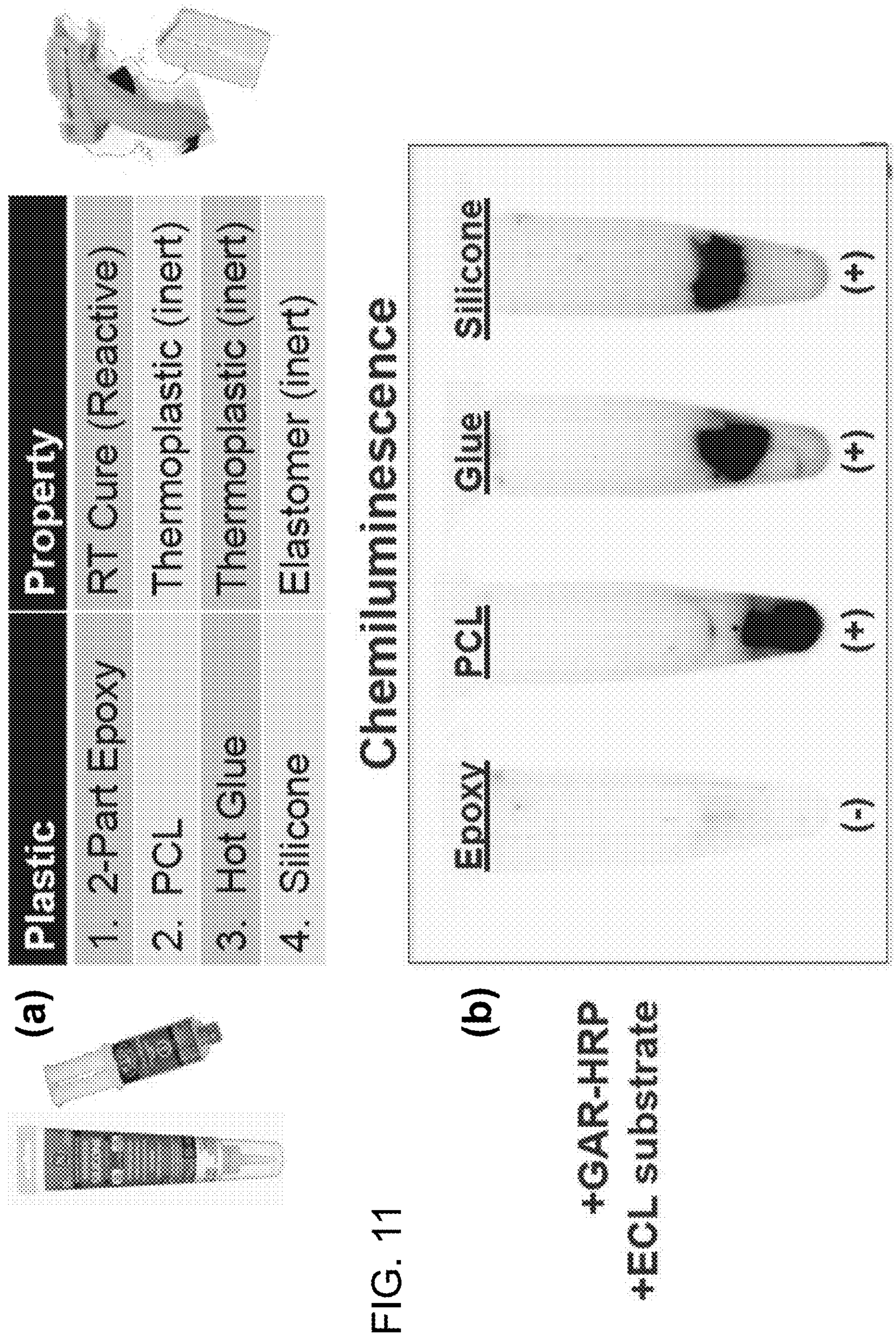
FIG. 11 depicts goat anti-rabbit antibody conjugated to horseradish peroxidase enzyme (GAR-HRP) blended with a 2-component epoxy, polycaprolactone diol (PCL), hot glue, and silicone elastomer while retaining the functionality of the antibodies.

With regard to FIG. 11, the rabbit IgG ionic liquid is the same as used in FIG. 10. In FIG. 11, we explored the miscibility and activity of rabbit IgG antibody ionic blended with: (1) 2-part epoxy and cured at room temperature, (2) polycaprolactone (PCL) at 95° C. and cooled, (3) hot glue at 95° C. and cooled, and (4) silicone elastomer and cured at room temperature. Antibody-based materials were tested for binding with a secondary antibody of goat-Anti-rabbit conjugated to HRP and presence of chemiluminescence. The ionic liquid was made from cationized rabbit IgG and Poly(ethylene glycol) 4-nonylphenyl 3-sulfopropyl ether anions, lyophilized, and melted to form viscous antibody liquid.

Figure 12:
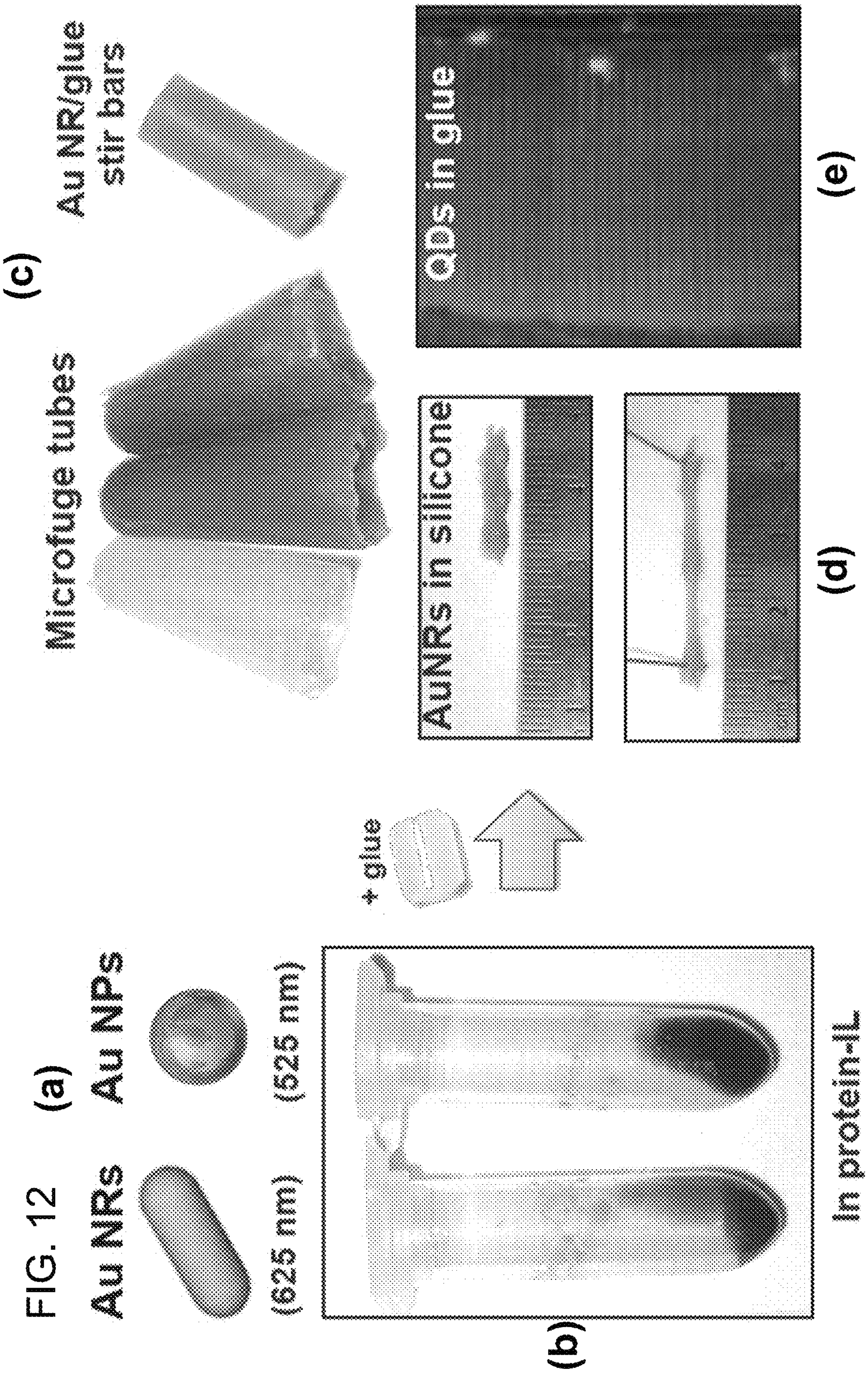
FIG. 12 depicts gold nanorods (NRs) and nanoparticles (NPs) as well as quantum dots (QDs) dispersed in a chymotrypsin ionic liquid and blended with hot glue or silicone elastomer, while retaining optical activity.

With regard to FIGS. 12, optically-active nanomaterials (nanorods and nanoparticles (image (a)) dispersed in chymotrypsin ionic liquid (image (b)) were blended with hot glue at 95° C. and molded into the shapes of microfuge tubes and magnetic stir bars (image (c)), blended with silicone and cured to form a string (image (d)), or patterned on a surface (image (e)) to produce fluorescent 2D patterns of quantum dots (QDs). In making the ionic liquid, we used cationized chymotrypsin and anions of Poly(ethylene glycol) 4-nonylphenyl 3-sulfopropyl ether. The cationized chymotrypsin and anion complex is lyophilized and melted to form water-free ionic liquid. The QDs are distinct from gold NPs and NRs. QDs are comprised of core shell CdSe/ZnS particles that exhibit intense fluorescence. In general, both gold and QDs are optically active. For example, QDs emit fluorescence while gold strongly absorbs visible light.

Methods

FIG. 1

Melanin-like ionic liquids were prepared by polymerizing dopamine in the presence of dimethylaminopropylamine and tris buffer for 18 hours, balancing charges with a stoichiometric amount of poly(ethylene glycol) 4-nonylphenyl 3-sulfopropyl ether anions, lyophilizing to dryness, and melting to form a melanin-like ionic liquid at about 50° C. Delignified balsa wood was treated with the melanin-like ionic liquid by painting ionic liquid on a wood surface and allowing infiltration.

FIG. 2

Melanin-like ionic liquid (prepared by the process described above) was blended with an ethyl acetate based nail polish or a kids' non-toxic water-based clear nail polish at room temperature to reach a uniform consistency. Nail polish containing melanin-like ionic liquid was applied by brush on a glass slide and air-dried. In parallel, melanin-like ionic liquid was also spotted on a glass slide. The dried nail polish film or dried melanin-like ionic liquid (no polish) was treated both with and without bleach.

FIGS. 3-7

I. A water-free protein ionic liquid was first created by electrostatically balancing cationized proteins of polyclonal antibodies (e.g. IgG antibodies from rabbit serum), enzymes (e.g. horseradish peroxidase enzymes), green fluorescent proteins, or photosystem complexes from spinach with a stoichiometric amount of anionic polymer surfactants (poly (ethylene glycol) 4-nonylphenyl 3-sulfopropyl ether) to obtain charge neutrality. The cationized protein/anion pairs were lyophilized to remove water and melted at about 25-85° C., e.g. about 50° C., to form a viscous protein ionic liquid.

II. Protein ionic liquids were combined with solid pieces of hot glue plastic adhesive at 10-15 wt % and melted on a hot plate at about 95° C., which is the melting temperature of the particular hot glue, until both materials flowed as a viscous liquid.

III. Protein ionic liquids were blended with melted hot glue at about 95-145° C., e.g. about 95° C., until homogeneity and a uniform consistency was reached.

IV. After blending, the plastic containing protein ionic liquid was cooled at room temperature until solidified. To obtain final bioactive structures, protein blended plastic materials were remelted at about 95-145° C., e.g. about 95° C., in PDMS molds to generate desired shapes (e.g. a miniature B2 bomber, a cylinder, and a threaded screw). A vacuum oven may be used in this step. The vacuum oven provided heating (~95° C.-145° C.) to melt hot glue or polycaprolactone plastics and a constant vacuum to help remove air bubbles in plastic caused from the blending process under negative pressure.

V. Protein ionic liquids of IgG antibodies from rabbit serum or horse radish peroxidase (HRP) enzymes embedded in plastic were cross-sectioned and assayed for binding or enzymatic activity using a secondary goat Anti-rabbit antibody conjugated to HRP or chemiluminescent substrate. Cross-sectioning of both materials showed binding and enzymatic activity distributed uniformly throughout plastic independent of how the plastic is cut, divided, reshaped, and/or remelted.

FIG. 8

Horseradish peroxidase ionic liquid (HRP-IL) was blended with hot glue at 95° C. and molded into the shape of a cone using 25 wt % HRP-IL; or blended with polycaprolactone (PCL) at 16 wt % at 95 C and molded into the shape of a cylinder; or blended with PDMS using ~5 wt % HRP-IL and cured at room temperature for 24 hrs in a 5 mL syringe with a corkscrew channel. PCL and hot glue containing HRP-IL were tested for enzymatic activity by adding ECL substrate and measuring chemiluminescence; PDMS containing HRP-IL was tested for activity using ABTS/$H_2O_2$ colorimetric based substrate.

FIG. 9

Chymotrypsin ionic liquid was mixed with hot glue at ~95° C. and cooled. The hot glue containing chymotrypsin ionic liquid was tested for cleavage of bovine serum albumin (BSA). Glue pieces with chymotrypsin were incubated with BSA in bicarbonate buffer at 37° C. for 18 hours and analyzed for cleavage fragments by polyacrylamide gel electrophoresis.

FIG. 10

Rabbit IgG antibody ionic liquid was blended with hot glue at 95° C. and patterned on a surface using a metal comb to create 2D patterns, applied to the bottoms of a 96-well plate to create a glue bottom, and used to glue two microfuge pieces together. The antibody glue patterns, well bottoms, and glued microfuge tube were tested for binding activity with a goat-anti-rabbit antibody conjugated to HRP and measured for chemiluminescence.

FIG. 11

Rabbit IgG antibody ionic liquid was blended with a 2-part epoxy and cured at room temperature; polycaprolactone (PCL) at 95° C. and cooled; hot glue at 95° C. and cooled; and PDMS and cured at room temperature. Composites containing rabbit IgG ionic liquid were tested for binding with a goat-anti-rabbit and presence of chemiluminescence signal.

FIG. 12

Gold or quantum dot nanomaterials nanomaterials were suspended in chymotrypsin ionic liquid reconstituted in water, lyophilized to dryness, and heated to ~50° C. to produce a viscous chymotrypsin ionic liquid dispersed with gold or quantum dots. The chymotrypsin ionic liquid containing gold or quantum dots were blended with hot glue at 95° C. and molded into the shape of a microfuge tube or stir bar, blended with silicone elastomer and cured into the shape of a stretchable filament, or blended with hot glue at 95° C. to create fluorescent 2D patterns of quantum dots in glue.

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Protein ionic liquids (incorporating e.g., antibodies, enzymes, fluorescent proteins) were blended with "inert" thermoplastics to create functional plastics embedded with proteins exhibiting biological activity. Notably, protein embedded plastics are in a "ready to use" bioactive format and do not require removal of proteins from plastic for use. For example, in the prior art, DNA encapsulated and stored in polycaprolactone requires extraction by tetrahydrofuran and purification in order to function. Also, the high loading and homogenous blend of proteins embedded throughout the plastic offers the ability to harness, replicate, and access biological activity from anywhere within a plastic structure by cross-sectioning into multiple pieces or remolding into new forms. In comparison to the prior art, protein-embedded plastic eliminates the need for surface functionalization using current modification methods (e.g. 96-well plastic plates for ELISA).

The invention provides for the creation of biologically-active thermoplastics containing embedded functional proteins in the form of protein ionic liquids. Uses include bioactive glues; biodegradable and user-attritable plastics; implantable plastics for biomedical devices/components with improved biocompatibility and function; 4D printing of specialized plastic parts exhibiting bioactivity; enzymatically-active plastics operating with increased rates at high temps; plastics containing antibodies or biorecognition elements for diagnostic and sensor platforms (e.g. plastic coated electrodes for electrochemical sensing, 96-well plates); energy/light harvesting plastics based on photosynthetic proteins/machinery; microcrack detection; biologically active plastics for packaging applications (e.g. multi-use packaging for MRE's); and/or ability to hide proteins in plastic for anti-counterfeiting, barcoding, and/or authentication. Other benefits include a reduction of plastic waste by replacement with ~10-15 wt % protein content and improvements in biomolecular stability of plastic embedded proteins with respect to shelf-life, tolerance to elevated temps, and exposure to humidity.

The incorporation of protein ionic liquids embedded within plastic offers greater biomolecular stability of proteins against elevated temps and exposure to humidity under real world conditions than pure protein ionic liquids on their own. Besides thermoplastics, biological activity (i.e. from enzymes) was similarly introduced into alternative bioincompatible materials using protein ionic liquids. These materials included silicon-based elastomers (silicone and polydimethylsiloxane (PDMS)) and two-component epoxies. For example, enzymatically-active PDMS was created with a central corkscrew microfluidic channel using horse radish peroxidase ionic liquids. Other variations may include the addition of two or more proteins (e.g. antibodies and enzymes) within a single piece of plastic to create enzymatically-active plastic combined with the binding specificity of antibodies or the assembly of two or more pieces of plastic with each containing a different protein ionic liquid to obtain a complementary set of biological functions (e.g. enzyme cascades) or any combinations thereof.

FIG. 1 depicts the creation of melanin-like ionic liquids and uses for converting soft wood into hard wood by infiltration with a melanin-like ionic liquid. Melanin-like ionic liquids were formed by combining cationic polymerized dopamine (pDopamine) with poly(ethylene glycol) 4-nonylphenyl 3-sulfopropyl ether anions. Cationic polymerized dopamine was synthesized by addition of dimethylaminopropylamine during base catalyzed polymerization of dopamine in 0.25M Tris buffer (pH 8.6). Dopamine and dimethylaminopropylamine were incubated in Tris buffer for about 12-48 hours, e.g. about 18 hours, until solution became dark brown indicative of melanin-like particles. After formation, cationic polymerized dopamine was dialyzed, combined with anions, and lyophilized to create ionic liquids. Images (a-b) show the formation of a viscous dark brown ionic liquid in microfuge tube (inset); the SEM images show spherical morphologies of melanin-like particles. Images (c-e) show balsa wood (c), delignified balsa wood (d) (obtained by boiling in 30% $H_2O_2$), and delignified balsa wood treated with melanin-like ionic liquids (e). In the latter, the melanin-like ionic liquid was liberally painted onto the top surface of delignified balsa wood and allowed to infiltrate the wood's xylem interior. Here, the use of ionic liquids increases infiltration of wood vs. soaking in pDopamine only (image (f)) leading to artificially harder wood materials. To be clear, melanin is formed by the oxidation/polymerization of tyrosine, while melanin-like materials are formed by the oxidation/polymerization of dopamine and other monomers. However, they share similar properties (e.g. broadband absorbance, morphology, sizes). The artificially harder materials may be useful in subtractive manufacturing. For example, it's easier to saw and shape soft woods (e.g. balsa) vs. hard woods using power or hand tools. After the soft wood is cut and shaped, it may be converted into a hard wood by infiltrating wood with a melanin-like ionic liquid.

FIG. 2 illustrates processing melanin-like ionic liquids (pDopamine IL) in solvents and nail polish, i.e. ethylene acetate. Images (a-b) show SEM micrographs of melanin-like ionic liquids and their dissolution in water, toluene, and DMF solvents. Image (c) shows dissolution of melanin-like ionic liquids in clear nail polish (in microfuge tube). The four-image matrix (d-g) shows the melanin-like ionic liquid dissolved in clear nail polish, applied to a glass slide, and air dried (image (d)). Image (e) shows dried film of melanin-like ionic liquid in nail polish treated with 2% bleach (hypochlorite ClO—). The melanin-like material in nail polish is not affected by bleach and retains its brown color. Images (f-g) are pDopamine in water spotted and air dried on a glass slide without (f) and with (g) bleach treatment. The bleach-treated pDopamine (no nail polish, image (g)) is degraded by bleach.

The use of nail polish enables the formation of conformal hard films of proteins or pigments that are protected against chemical degradation. Images (h-i) show a goat anti-mouse (GAM) antibody conjugated with alkaline phosphatase (GAM-AP), converted into an ionic liquid, dissolved in a kids non-toxic water soluble clear nail polish, i.e. Little Ondine™, applied as a film on a glass slide by air drying, and lifted off the glass to yield a freestanding film. The two nail polish films (images h-i)) with GAM-AP IL are shown without and with substrate added. The teal color from the film on image (i) (without substrate) indicates formation of colorimetric product from enzymatic reaction with alkaline phosphatase. Image (j) (with added substrate) is another example of the incorporation of bioenergetic nanomaterials, e.g. aluminum nanoparticles dispersed in ferritin ionic liquid, in nail polish and shows a dried film. The non-toxic water-soluble nail polish is semi-permeable and enables access to enzymes vs. the impermeability of ethyl acetate based nail polish. The addition of aluminum nanoparticles dispersed in ferritin ionic liquid as a bioenergetic nanomaterial demonstrates miscibility with ethyl acetate based nail polish.

FIG. 3 depicts green fluorescent protein (GFP) ionic liquids that were blended with a 2-component epoxy (hardener and resin) (image (a)) at room temperature to homogeneity and molded into the shape of a B-2 bomber replica (b-c) or around a magnetic micro stir bar (d). Images (b-c) show a B-2 bomber consisting of a cured blend of GFP ionic liquid/epoxy under white light illumination (b) and under UV excitation (c) to induce fluorescence of embedded GFP. Image (e) depicts GFP ionic liquid blended with a commercial hot glue stick to create functional bioplastics using high temperature processing. For processing, a piece of solid hot glue stick (mp=~90° C.) was melted in the presence of GFP ionic liquid on a hot plate at 95° C. until flowing, blended together to reach homogeneity, and solidified into the new bioplastic material (image (f)) by cooling to room temperature. Bioplastic containing a uniform blend of GFP and hot glue was remolded into the original dimensions of a glue stick (f) to accommodate the feed mechanism and nozzle of a hot glue gun (g). The GFP/hot glue stick (shown as a light green cylinder in image (f)) was loaded into a hot glue gun and applied as a hot melt to glue broken objects together. Image (h) shows three objects hot-glued together using GFP ionic liquid bioplastic consisting of a broken disposable pipette, piece of coral, and a plastic puppy figurine. The arrows (image (h)) depict the location of hot-glued interface. In this application, the hot-glued interface of each object exhibited uniform fluorescence (image (i)) from the presence of the GFP and indicated that entrapment within plastic had no effect on the GFP's physical properties.

FIG. 4 depicts the examination of the effects of blending GFP ionic liquid with hot glue (image (a)) by determining its ability to biosynthesize gold nanoparticles. GFP is capable of forming gold nanoparticles through tyrosine-mediated reduction of $Au^{3+}$ salts and requires a transfer of electrons; however, this reaction can only proceed if the GFP entombed within the plastic is accessible to gold ions and is redox active. That is, the GFP entombed in the plastic is redox active towards gold ions.

We incubated a bulk size cylinder of GFP/hot glue with $Au^{3+}$. After 3 days of incubation, the GFP/hot glue bioplastic cylinder turned a red color due to the formation of gold nanoparticles and resulted in enhancement of GFP fluorescence as shown by white light (image (b)) and epifluorescence (image (c)) images. To determine the accessibility and depth of mineralized gold within GFP/plastic below the surface (i.e. GFP mediated gold formation), we imaged (image (d)) a cross-sectional area of gold-mineralized plastic containing GFP and showed the presence of gold nanoparticles continuing from the surface to ~4-6 mm deep. This confirms that surface GFP as well as the interior plastic embedded GFP below the surface remains accessible and active for gold synthesis. Images (e-h) present the control reaction shows the synthesis of gold nanoparticles upon addition of $Au^{3+}$ salt to GFP in buffer solution (i.e. without ionic liquid). Images (f-h) show microfuge tubes containing GFP only and gold nanoparticles synthesized by GFP under white light and UV excitation. By comparison, the fluorescence of GFP in buffer was quenched (image (h)) by formation of gold nanoparticles.

FIG. 5 presents the creation and binding activity of glue blended with rabbit IgG antibody ionic liquids. Ionic liquids of Antibody-Au NP conjugates were blended with hot glue at 95° C. and molded into a rectangular block (image (a)). Image (a) shows the uniform dispersion of Antibody-Au conjugates in block and semi-transparent properties. "AFRL" is written on the glass slide and placed below the red block to demonstrate the semi-transparent nature. The block of image (a) is cross-sectioned into three pieces to demonstrate the uniformity of antibody-gold throughout glue interior. Image (b) presents the UV-Vis spectrum and compares the plasmon resonance peaks of antibody-Au in water and blended in hot glue. The absorbance peaks in water and glue show similar wavelengths and peak shapes. Images (c-d) present binding assay of antibodies in glue with secondary antibodies. The column of image (c) shows the colorimetric result from incubation of glue only (control sample) and two different molded forms of antibody glue (screw mold and B2 bomber) with a goat-Anti-rabbit antibody conjugated to alkaline phosphatase enzyme (GAR-AP), washed, and developed with addition of colorimetric substrate. The column of image (d) presents chemiluminescence of cross-sectioned pieces of the glue only and the molded antibody glues incubated with a goat-Anti-rabbit antibody conjugated to horseradish peroxidase enzyme (GAR-HRP), washed, and developed by addition of substrate (luminol/$H_2O_2$).

Figure 6:
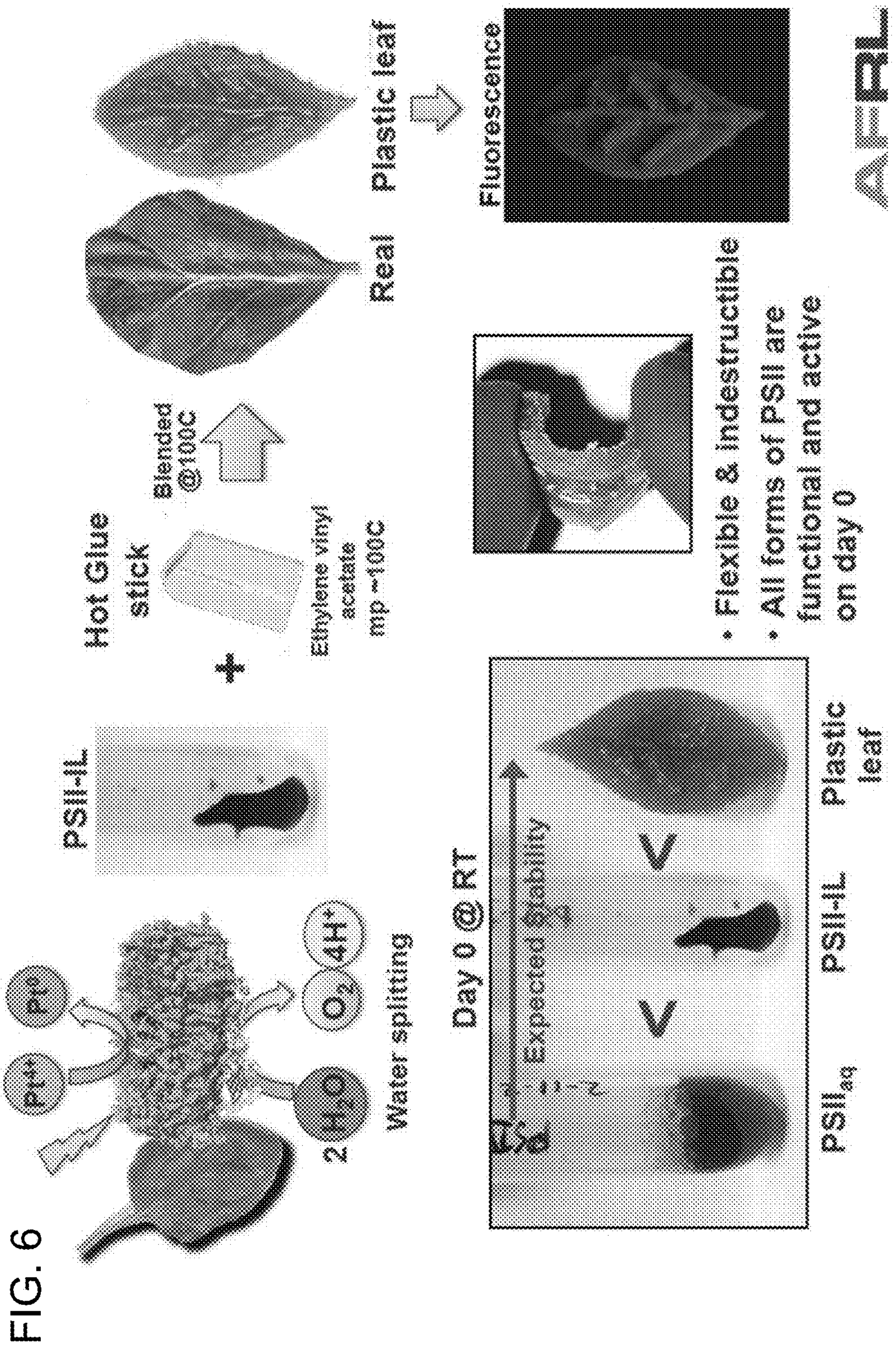
FIG. 6 depicts the creation of an artificial plastic leaf from photosystem II protein (PS II) ionic liquid blended with hot glue while retaining the functionality of the PS II proteins.

FIG. 6 illustrates the creation of an artificial plastic leaf containing photosystem II from spinach. Photosystem II ionic liquid is blended with hot glue at 95° C. and molded into the shape of a leaf. Photosystem II (PSII) was extracted from raw spinach by pulverizing spinach leaves in phosphate buffer, sucrose, and sodium chloride, and centrifuging to remove cell debris. Triton-X was added to solubilize PSII during extraction. Extracted PSII was cationized and electrostatically balanced with anionic polymer surfactants (i.e. poly(ethylene glycol) 4-nonylphenyl 3-sulfopropyl ether) to obtain a cationized PSII/Anion complex. The cationized PSII/anion complex was lyophilized to dryness to produce a viscous dark green ionic liquid and blended with hot glue plastic at 95° C., cooled, and then remelted at 95° C. and molded in the shape of a leaf using a PDMS mold.

Figure 7:
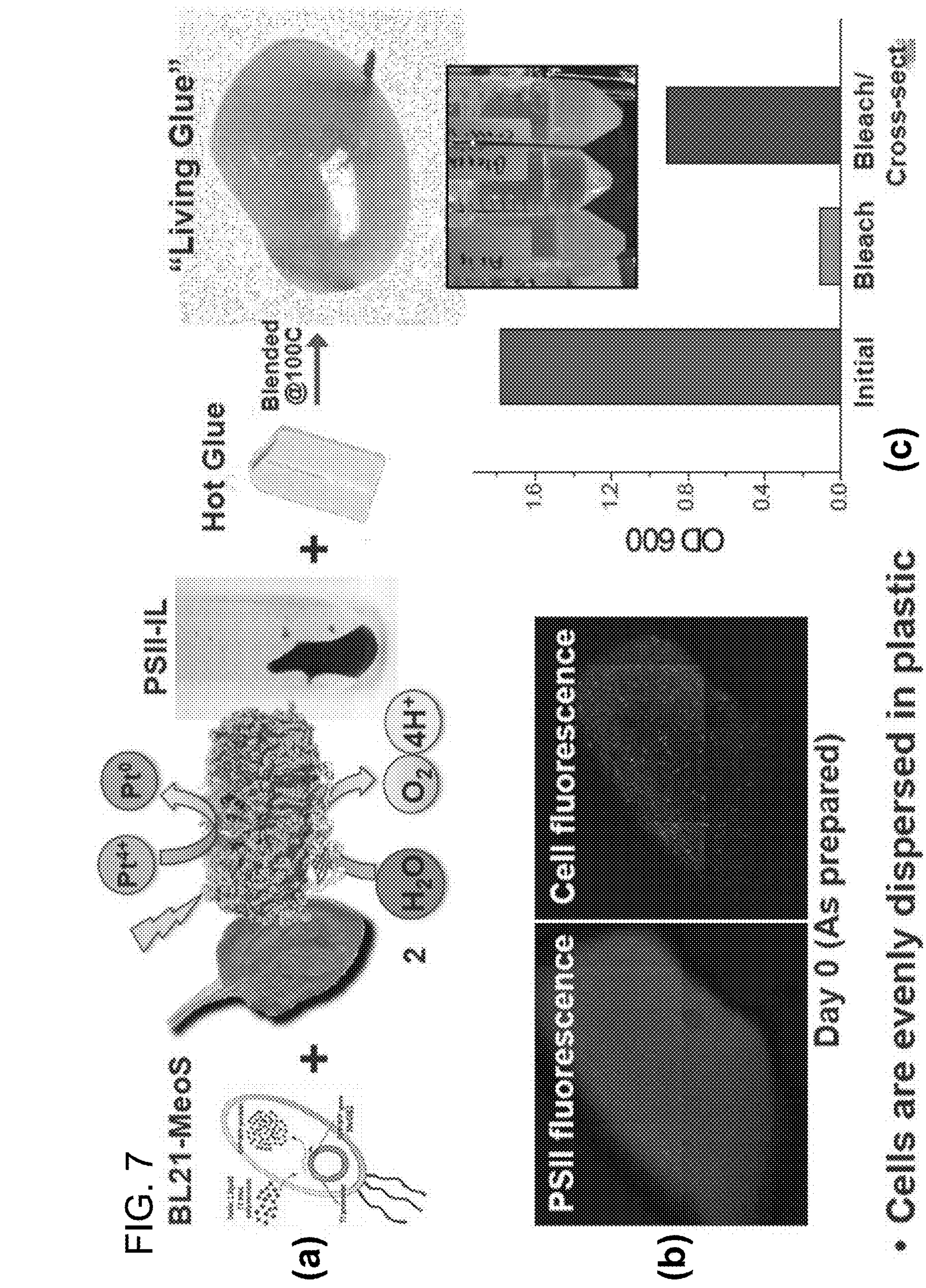
FIG. 7 depicts bacteria with PS II ionic liquid blended with hot glue to create a "living" glue that retains bacteria viability.

FIG. 7 presents the formation of "living" hot glue containing bacteria suspended in Photosystem II ionic liquid (PSII-IL) and blended with hot glue. Image (a) shows the addition of bacteria in PSII-IL and hot glue to create a semi-transparent green "living glue." To obtain bacteria, *E. coli* (DH5a strain) was transformed with a PST44 plasmid containing the gene for a photoswitchable fluorescent protein (Meos2). *E. coli* expressing fluorescent Meos2 protein was grown overnight in liquid culture of LB agar with ampicillin. 100 μL of bacteria from overnight culture was centrifuged to obtain a cell pellet, resuspended in 30 μL of PSII-IL, and lyophilized to remove water. Bacteria suspended in PSII-IL was then uniformly blended with hot glue at ~95° C. and cooled. Image (b) shows confocal fluorescence image of green fluorescent bacteria dispersed in PSII-IL (red fluorescence) and glue. Bar graph (image (c)) presents cell viability of bacteria/PSII-IL in glue after processing. Cell viability was determined by incubating pieces of glue with embedded bacteria/PSII-IL in LB media at 37° C. for 18 hours and measuring the optical density at 600 nm (OD600) in a cuvette. The larger value of OD600 indicates a higher numbers of viable cells. The bar graph shows the initial cell viability of bacteria in PSII/glue immediately after processing at 95° C. (large number of viable cells), bacteria glue pieces after soaking in chlorine bleach for 5 minutes to inactivate bacteria embedded near the glue surface (little to no cell growth from bleach), and bacteria glue pieces that were first bleached for 5 minutes to kill surface exposed bacteria and then cross-sectioned and grown in LB media (intermediate number of cells). In this last case, bleaching followed by cross-sectioning was performed to verify that cells embedded within the glue interior were resistant to bleach and were viable.

FIG. 8 illustrates horseradish peroxidase ionic liquids (HRP-ILs) that were combined and blended with hot glue or polycaprolactone to generate enzymatically-active plastic materials. HRP-IL is processed with hot glue or polycaprolactone at 16-25 wt % to (image (a)) form protein/plastic blended materials and molded into the form of a cone or cylinder (image (b)). To test enzymatic activity of hot glue plastic or polycaprolactone containing HRP-IL, we immersed the cone with ECL substrate (luminol+peroxide) and measured chemiluminescence. ECL is a luminol based chemiluminescent substrate used with horseradish peroxidase enzymes (HRP). In the presence of substrate, the HRP-IL/hot glue and HRP-IL/polycaprolactone materials (image (c)) generated intense chemiluminescence signals and remained active embedded in plastic, as shown. The left tube in image (c) and the left tube in image (d) show no chemiluminescence of control samples containing no HRP enzyme. Image (e) shows HRP-IL blended and cured with polydimethylsilane (PDMS). HRP-IL/PDMS was poured into a 5 mL disposable plastic syringe, molded around a central corkscrew, and cured at about 25-100° C., e.g. about 65° C., until solidified. After curing, the corkscrew was removed by unscrewing to create a helical microfluidic channel with embedded enzymatic activity. Image (e) shows the addition of a colorimetric substrate ABTS, i.e. 2,2'-Azinobis [3-ethylbenzothiazoline-6-sulfonic acid]-diammonium salt which is a colorimetric substrate for HRP, specific to HRP at the top of the syringe and passage through corkscrew channel where enzymatic reaction occurs and colorimetric product exits syringe. ABTS changes from colorless to a teal color in the presence of an active HRP enzyme.

FIG. 9 illustrates the creation and enzymatic activity of proteolytic glue. Chymotrypsin was converted into a protein ionic liquid (chymo-IL) and blended with hot glue (image (a)) at about 95° C. until a uniform consistency was obtained. Image (a) shows a molecular ribbon structure of chymotrypsin enzyme. Image (b) shows a single piece of glue blended with chymotrypsin ionic liquid (left) and glue containing chymotrypsin ionic liquid cut into multiple pieces (right) to increase surface area. Image (c) presents polyacrylamide gel electrophoresis of substrate and product from enzymatic assay using chymotrypsin glue. Enzymatic assay was performed by incubating glue pieces with bovine serum albumin (BSA) substrate in bicarbonate buffer at about 37° C. for 4-48 hours, e.g. about 18 hours. Gel lanes of image (c) (from left to right) were loaded respectively with a molecular weight (MW) ladder, BSA substrate initially with no enzyme, free chymotrypsin (Chym)+BSA (positive control), 1 glue piece containing chymotrypsin ionic liquid+BSA, and 7 glue pieces containing chymotrypsin ionic liquid+BSA. Arrows on right of image (c) indicate cleavage of BSA in protein fragments from chymotrypsin in glue.

FIG. 10 presents examples of applications utilizing antibody glues. Image (a) presents a chemiluminescence image of a sandwich binding assay of anti-ferritin antibody ionic liquids in glue (right) and glue only control (left). The antibody glue or glue only was incubated with ferritin antigens, washed, incubated with anti-ferritin antibodies conjugated to HRP, and developed for chemiluminescence. Image (b) presents a chemiluminescence image of antibody glues patterned with micron level resolution using a metal comb and assayed for secondary antibody binding with GAR-HRP antibody conjugates. Image (c) shows a microfuge tube cut in half and glued together using antibody glue, and then assayed for binding with GAR-HRP by chemiluminescence. Antibody glue was also used to form well plate bottoms (image (d)) by punching out the original plastic well bottoms and replacing them with new well bottoms of antibody glue. To form the well bottom surface, the antibody glue was melted at about 95° C., smeared to form well bottoms, and cooled to form a solid, water-tight bottom surface. The antibody glue bottoms of the well plate were assayed for binding using a microplate reader and measured for chemiluminescence after binding to different concentrations of GAR-HRP. The green (top) line of image (d) indicates IgG antibodies adsorbed onto the plastic surface of well plate bottoms. This represents the conventional method of immobilizing antigens or antibodies on well plates for ELISA assays using simple adsorption processes.

FIG. 11 presents binding activity of antibody ionic liquids blended into different biologically-incompatible materials. Antibody ionic liquids were blended in a 2-component epoxy, polycaprolactone diol (PCL), hot glue, and silicone elastomer (caulk) and incubated with GAR-HRP, washed, and imaged for chemiluminescence (image (b)) after addition of substrates. Image (a) presents a table describing materials and properties.

FIG. 12 presents the addition of gold (Au) and quantum dot (QDs) nanomaterials to hot glue and silicone with a chymotrypsin protein ionic liquid. Image (a) presents two types of Au nanomaterials (NRs=nanorods and NPs=nanoparticles) dispersed in a chymotrypsin protein ionic liquid (image (b)). The Au nanomaterials dispersed in chymotrypsin protein ionic liquid were blended with hot glue or commercial grade silicone and molded into microfuge tubes or around magnetic stir bars (image c)) to produce a plastic coating of embedded gold nanorods. Image (d) present Au NR/chymotrypsin IL in silicone before and after stretching. QDs dispersed in chymotrypsin ionic liquid were blended with hot glue and patterned. Image (d) shows the QD fluorescence pattern in glue.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of making an ionic liquid comprising:

preparing an ionic liquid by polymerizing dopamine in the presence of dimethylaminopropylamine and tris buffer for 18 hours, balancing charges with a stoichiometric amount of poly(ethylene glycol) 4-nonylphenyl 3-sulfopropyl ether anions, lyophilizing to dryness, and melting to form a an ionic liquid at about 50° C.

* * * * *